Nov. 29, 1949   O. F. A. ARNOLD ET AL   2,489,254
RADIO SYSTEM
Filed Jan. 4, 1944   2 Sheets-Sheet 1

INVENTORS
OTTO F. A. ARNOLD.
DAVID A. BREISTER.
BY William D Hall
Attorney

Nov. 29, 1949     O. F. A. ARNOLD ET AL     2,489,254
RADIO SYSTEM

Filed Jan. 4, 1944     2 Sheets-Sheet 2

*INVENTORS*
OTTO F. A. ARNOLD.
DAVID A. BREISTER.
BY William D. Hall
*Attorney*

Patented Nov. 29, 1949

2,489,254

UNITED STATES PATENT OFFICE 2,489,254

RADIO SYSTEM

Otto F. A. Arnold, New York, N. Y., and David A. Breister, Milwaukee, Wis.

Application January 4, 1944, Serial No. 516,950

5 Claims. (Cl. 250—20)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to interference reduction in signaling equipment, particularly the type used in radio pulse-echo systems for object detection, although the invention is equally applicable to other systems using similar types of signals.

In conventional pulse-echo object-detection systems, pulses of radio frequency energy of fixed frequency are transmitted at spaced intervals, the duration of each pulse being a minute fraction of the intervals therebetween. On striking a target, reflected pulses are received and the observed time interval between the transmitted and received pulses is a measure of the distance. For measuring purposes, both the transmitted signals and the received echoes are used to vertically deflect the beam of an oscilloscope, the horizontal trace of which is synchronized with the transmitted pulses. The distance between the two deflections of the oscilloscope trace is a measure of the distance of the reflecting object.

In order to obtain accurate definition of the sharp pulses generated in such systems, it is necessary to use receivers having wide band channels. This feature results in considerable interference when a plurality of units operating on nearby frequencies, which are within the pass-band of said channels, are located in the same area. Moreover, since such units are not pulsed synchronously, this gives rise to a plurality of pulse images continuously moving on the oscilloscope screen of any one unit, causing considerable difficulty in keeping track of the desired echoes and resulting in quick fatigue of the operating personnel.

In accordance with prior methods of overcoming these difficulties, a frequency responsive detector network, connected at some point in the radio frequency channel of the receiver, delivers a minimum output in response to signals at or near the mean or center frequency of said channel; but for signals which are displaced in frequency a predetermined amount from said center frequency, it delivers a unidirectional voltage, the magnitude of which is proportional to the amount of said displacement and the polarity of which is the same, whether said displacement is above or below said mean frequency. This voltage is then amplified and applied as a negative bias to the receiver channels or to the intensity grid of the oscilloscope, or both. If said displacement is more than a predetermined amount, the negative bias will be sufficient to greatly reduce or block either the receiver channel output or the oscilloscope beam, or both. As a result, off-frequency signals will not appear at all on the oscilloscope, or will at least be greatly reduced in intensity or size.

It is the main object of the present invention to generally improve the above-mentioned interference reducing system. It is a further object of the invention to provide an interference reducing unit which can be attached, with a minimum of circuit changes, to a wide variety of existing types of equipment operating at different frequencies.

For a better understanding of the invention, together with other and further objects thereof, reference is had to the following description taken in connection with the accompanying drawings, wherein like parts are indicated by like reference numerals, and its scope will be pointed out in the accompanying claims.

Figure 1:
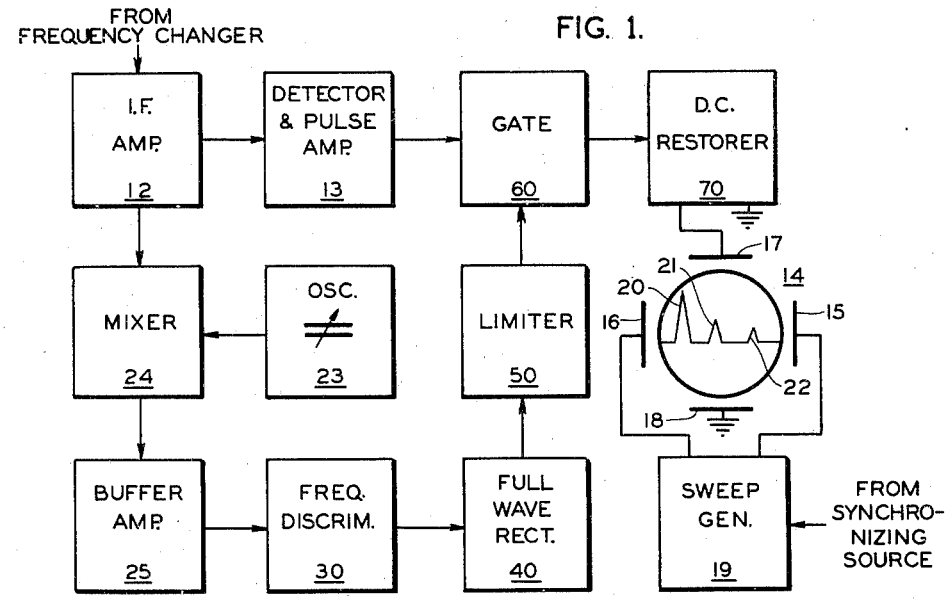
Figure 1 is a block diagram of a complete receiver incorporating the invention.

Referring to Figure 1, there is shown a portion of a conventional superheterodyne receiver including a tuned intermediate frequency (I. F.) amplifier 12, connected to a conventional frequency changer (not shown), a detector and pulse amplifier 13, and a signal reproducer 14.

The reproducer 14 is, in this case, a conventional cathode ray oscilloscope having a pair of horizontally deflecting electrodes 15 and 16, and a pair of vertically deflecting electrodes 17 and 18. The output of a saw-tooth sweep voltage generator 19 is applied to one pair of deflecting electrodes, in this case horizontally deflecting electrodes 15 and 16. The signal output of the receiver is applied to the other pair of deflecting electrodes 17 and 18.

As thus far described, the receiver system is one commonly used in object-detection systems above referred to. In a manner well known, each cycle of saw-tooth voltage of generator 19 is initiated synchronously, by means of a synchronizing source (not shown), with the tranmission of a pulse of high frequency radio energy from a transmitter (not shown). The transmitted pulse is impressed on the receiver, the output of which is in turn applied to deflecting electrodes 17 and 18, which vertically deflect the horizontal trace of the oscilloscope produced by the saw-tooth voltage, as indicated at 20. The reflected signals are also impressed on said receiver and will appear laterally displaced on the trace of the oscilloscope, as indicated at 21 or 22. The distance between the main signal trace 20 and the echo trace 21 or 22 is a measure of the distance of the reflecting object.

For reasons above referred to, the I. F. channel 12 must have a wide passband for transmission of sharp pulses without distortion. As a result, signals from nearby transmitters operating at any frequency within the passband of said channel cause considerable interference. By means of the auxiliary circuits hereinafter described, which constitute the subject matter of this invention, the effects of this type of interference are considerably reduced or entirely eliminated.

The auxiliary circuits referred to are connected to any suitable point in I. F. channel 12. Said circuits include an additional tunable frequency changer to convert the I. F. to a lower frequency current to which the components 25 and 30 are tuned. The frequency changer comprises a tunable oscillator 23 and mixer 24, to which the I. F. and oscillator currents are applied. The buffer amplifier 25 is tuned to the difference frequency component in the mixer output, and it amplifies said output and isolates the frequency discriminator 30 from the frequency changer.

Figure 2:
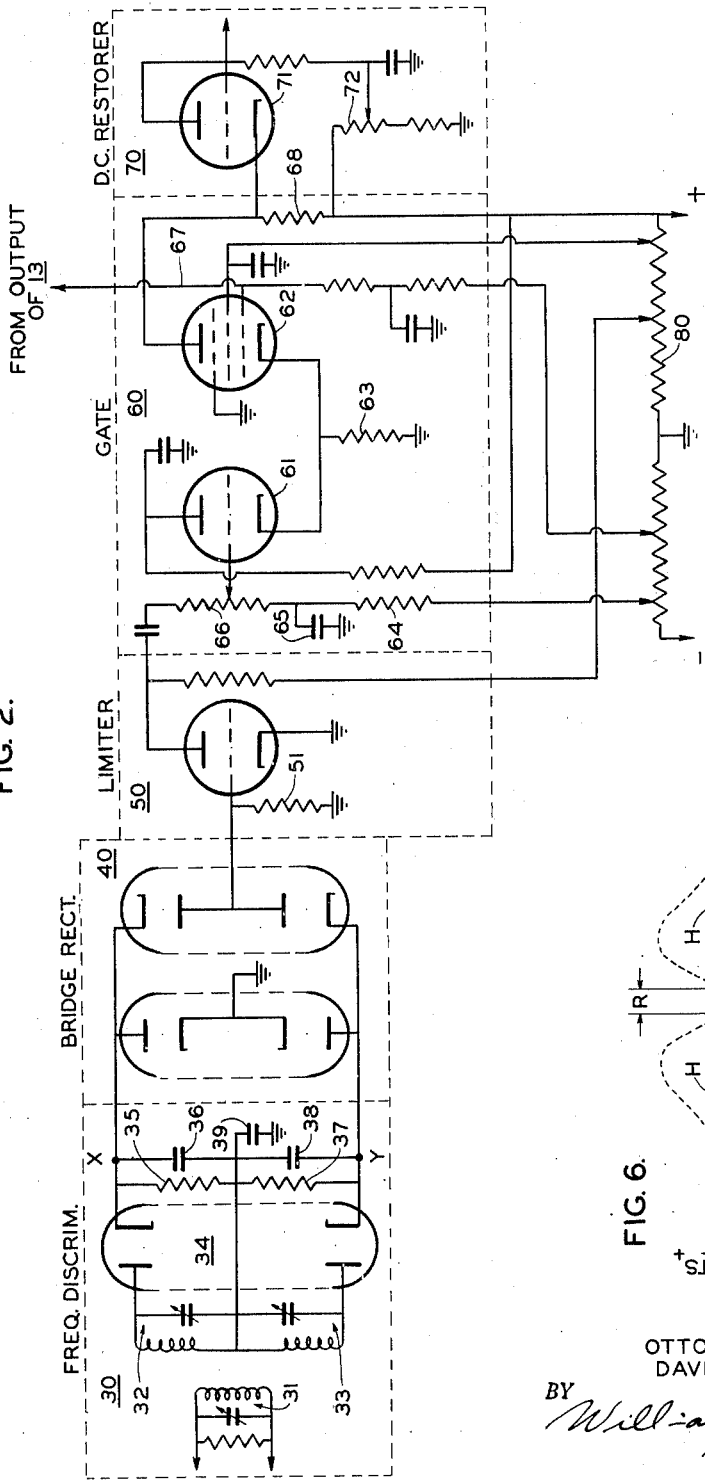
Figure 2 is a circuit diagram of the invention.

Discriminator 30 is similar to the type used for detection of frequency modulated waves. Referring also to Figure 2, said discriminator comprises a primary circuit 31 so tuned that its center frequency is equal to the difference frequency output of mixer 24. To flatten the response curve, a resistor is shunted across the primary, as shown.

Coupled to the primary 31 are two sharply-tuned secondary circuits 32 and 33, respectively tuned above and below the center frequency of the primary circuit. The outputs of circuits 32 and 33 are separately rectified by the two diode sections of a type 6H6 duodiode 34, the rectified outputs appearing across equal load resistors 35 and 37, shunted by condensers 36 and 38, respectively. The junction point of said resistors is connected to ground through a condenser 39.

Figure 3:
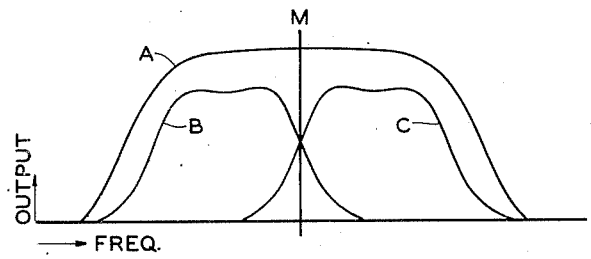
Figures 3-6 are graphs illustrating the operation of the circuit in Figure 2.
Figure 4:
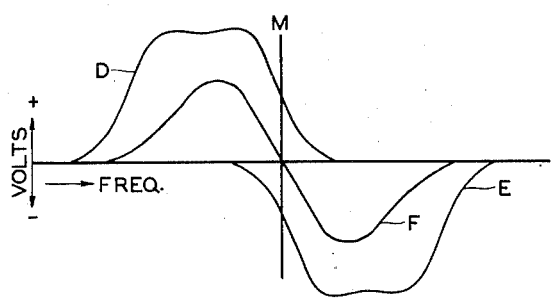

The operation of discriminator 30 will now be described with reference to the curves in Figures 3 and 4. Curve A represents the frequency response characteristic of buffer amplifier 25 and primary circuit 31. This response is flat over an appreciable band which is at least equal to the band-width of I. F. amplifier 12. Curves B and C show the frequency response characteristics of secondary circuits 32 and 33 respectively. It will be seen that curves B and C maximize on opposite sides of the center or mean frequency of the primary circuit, indicated by line M.

It will be noted that the diodes and their load resistors 35 and 37 are so connected that the voltages thereacross oppose each other, as represented by curves D and E. The resultant voltage across points X and Y is approximately indicated by curve F. It will be seen that the resultant voltage is zero at the center frequency and increases for frequencies displaced from said center frequency. The polarity of said voltage is, however, dependent upon the direction of said displacement.

Condensers 36 and 38 should be of low impedance to the I. F. carrier frequency components, but of high impedance to the pulse modulation components. The time constant of R.-C. networks 35—36 and 37—38 should each be considerably less than the pulse duration, so that the outputs across the diode load circuits will substantially follow the pulse envelope. Condenser 39 should be of high impedance to both carrier and pulse components.

Figure 5:
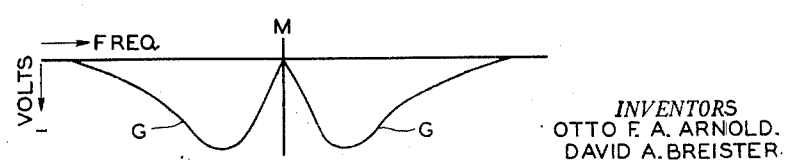

To derive a voltage having a polarity which is independent of the direction of displacement from the center frequency, the output of the discriminator is passed through a conventional bridge rectifier 40, the output of which is impressed across resistor 51, and has a characteristic such as shown by curve G in Figure 5. This voltage is zero or minimum at the center frequency, and negative for frequencies displaced at either side of this frequency.

Figure 6:
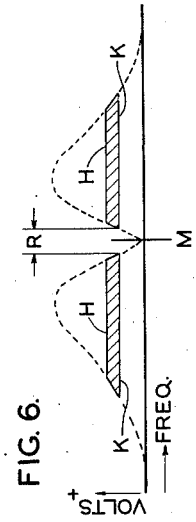

To make the magnitude of this voltage uniform regardless of the extent of frequency displacement, the bridge rectifier output is impressed across the input resistor 51 of a conventional amplitude limiting amplifier 50, the output of which is uniform for all input voltages above a predetermined minimum, as shown by line H in Figure 6. The dotted portion of the curve indicates the voltage change if no limiting took place. This voltage, which is now positive due to phase reversal in limiter 50, is impressed on electronic gate 60.

Gate 60 comprises two tubes 61 and 62. Triode 61 functions as a cathode follower stage, the load resistor 63 of which is also in the cathode circuit of pentode 62. Plate and grid potentials are derived as shown from the voltage divider 80 of a conventional power supply.

Tube 61 is normally kept nonconducting by means of a negative bias impressed on its grid from divider 80 through a filter, including resistor 64 and condenser 65, and through a signal input resistor 66. Hence there is normally no voltage drop across resistor 63, due to space current in tube 61, and the bias on the cathode of tube 62 is low. The plate and grid voltages on tube 62 are such as to render said tube normally conducting so that any detected signal impressed on the grid of tube 62 from element 13 through lead 67 will be amplified and passed on to the succeeding stage. However, when a positive signal above a predetermined amplitude, such as is indicated by line K in Figure 6, is impressed from limiter 50 upon input resistor 66, tube 61 is rendered conducting and the current through cathode resistor 63 is greatly increased. The resultant increase in voltage drop will increase the positive bias on the cathode of tube 62 sufficiently to drive it considerably below plate current cutoff, so that it will block any signal impressed upon it through lead 67. The predetermined amplitude at which tube 61 becomes conducting is determined by the grid bias on tube 61. By varying said grid bias, line K can be moved up or down, thus varying the width of the shaded portion between lines H and K. This in turn has the effect of varying the width of the center frequency region R in which gate 60 remains conducting. Interfering signal frequencies outside region R will cause gate 60 to block any signal.

Pulses appearing in the output circuit resistor 68 of the gate are passed through a D. C. restorer 70, which is essentially a biased diode circuit. Although a triode 71 is shown, the grid and plate are tied together, so that it functions as a diode. This circuit functions to pass signals of one polarity only which are above a predetermined amplitude. To adjust the level at which conduction occurs, the cathode is adjustably biased positive with respect to the anode by means of potentiometer 72. Signals across resistor 68 which have enough amplitude to overcome the delay bias will pass through the diode. Circuit 70 serves to prevent bending or laceration of the oscilloscope baseline due to the presence of strong interfering signals. The output of this circuit may, if necessary, be further amplified and applied to plates 17 and 18, whereby they will be indicated in the form of vertical deflections of the oscilloscope trace.

A resume of the operation of the entire system will now be given. All signals within the passband of I. F. amplifier 12 will be detected, amplified, and impressed through lead 67 (Figure 2) upon the control grid of tube 62 in gate 60. All of the signals will also be reduced in frequency by the frequency changer, including elements 23 and 24, and impressed upon frequency discriminator 30. Desired signals, i. e., those having a frequency at or near the center frequency of I. F. amplifier 12, will be reduced to a frequency which corresponds to the center frequency of discriminator 30, indicated by line M in Figures 3-6. As shown by curves G, H, and K, the resultant output of bridge rectifier 40 and limiter 50 is zero or minimum at this frequency. Hence, tube 61 in gate circuit 60 will remain nonconducting and tube 62 conducting, so that the latter will pass the desired signal to the succeeding circuits and the oscilloscope.

Upon the occurrence of an interfering signal, which has a frequency which is displaced more than a predetermined amount from the center frequency of discriminator 30, i. e., outside region R in Figure 6, a voltage indicated by curve H will function to render tube 61 conducting, and this in turn renders tube 62 nonconducting, thus blocking the interfering signal and preventing it from being indicated upon the oscilloscope.

Thus the auxiliary circuits function to prevent the reproduction of all signals upon the occurrence of an interfering signal the frequency of which is displaced more than a predetermined amount from the desired signal frequency. However, since most interference arising from nearby units is in the form of pulse-modulated signals, the desired signal pulses will still pass through the gate and be reproduced unless such pulse signals are exactly synchronized with the desired pulses; an occurrence which is extremely unlikely, if not impossible. Even if this should occur, it is a simple matter to change the phase or repetition rate of the desired signals.

An important feature of this invention is the use of a frequency changer to reduce the frequency applied to the discriminator. This serves to accentuate the percentage deviation between desired and undesired signal frequencies and permits sharper discrimination. Thus, if the intermediate frequency channel were operating at a center frequency of 20 megacycles and this frequency were reduced by the frequency changer to a frequency of 10 megacycles, to which the center frequency of the discriminator is adjusted, then the percentage deviation between a desired and undesired frequency at the I. F. channel 12 would be doubled at the discriminator 30.

Moreover, by making oscillator 24 tunable over an extended range, the discriminator channel can be permanently constructed at a fixed frequency, and the oscillator adjusted so as to change a wide variety of I. F. currents to the same fixed frequency. This makes the same interference reducing unit adaptable to a wide variety of receivers operating at different frequencies. The tunable oscillator 24 is also useful for compensating for slight changes in I. F. output of different receivers of the same type.

Although the invention has been described as applied to a system in which signals are indicated by a vertical deflection of a cathode ray trace, it is equally applicable to systems in which signals are indicated by modulating the intensity of a cathode ray beam. The invention is also applicable to systems using cathode ray tubes with magnetic beam deflecting means.

While there has been described what is at present considered a preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

We claim:

1. An interference reducing unit for use with any one of a plurality of radio pulse receivers having differently tuned carrier frequency channels, each receiver having a detector coupled to its channel, and an oscilloscope adapted to be controlled by the output of said detector; said unit comprising a frequency responsive discriminator tuned to a predetermined fixer frequency which is below the passband of any of said channels, a frequency converter having an input circuit adapted to be coupled to any of said channels and an output circuit coupled to the input of said discriminator, said converter being tunable over a range sufficient to convert the signal frequency output of any of said channels to said fixed frequency, said frequency discriminator being so constructed and arranged that it generates an appreciable voltage only in response to signals displaced a predetermined amount on either side of said fixed frequency, a normally conducting electron tube having a grid adapted to be coupled to the output of said detector and a load circuit adapted to be coupled to said oscilloscope, and means to so couple said tube to the output of said frequency discriminator that said tube is biased to cutoff when said output exceeds a predetermined amplitude.

2. An interference reducing unit for use with any one of a plurality of amplitude modulation radio pulse receivers having differently tuned intermediate frequency channels, each receiver having a detector coupled to its channel, and an oscilloscope controlled by the output of said detector; said unit comprising a frequency discriminator tuned to a predetermined fixed frequency which is below the passband of any of said channels, a frequency converter having an input circuit adapted to be coupled to any of said channels and an output circuit coupled to the input of said discriminator, said converter being tunable over a range sufficient to convert the intermediate frequency output of any of said channels to said fixed frequency, said frequency discriminator being so constructed and arranged that in response to signals displaced from said fixed frequency it yields an output having a fixed polarity, the magnitude of which varies with the extent of said displacement, an amplitude limiting circuit coupled to the output of said discrmnator, a normally conducting electron tube having a control electrode adapted to be coupled to the output of said detector and a load circuit adapted to be coupled to said oscilloscope, and means to so couple said tube to the output of said limiter that said tube is biased to cutoff by said output.

3. An interference reducing unit for use with any of a plurality of superheterodyne receivers respectively having fixedly-tuned intermediate frequency channels operating over different frequency ranges, a signal translating means excited by the output of each channel, and a normally conducting electron tube interposed between each channel and each translating means; said unit comprising a frequency discriminator circuit tuned to a fixed frequency which is below the frequency range of any of said channels for generating a unidirectional voltage only in response to signals of a frequency which is displaced in excess of a predetermined amount on either side of said fixed frequency, a frequency converter coupled to said discriminator circuit, said converter being tunable to convert the signal frequency output of any of said channels to said fixed frequency, and means to so couple the output of said frequency responsive discriminator circuit to said electron tube that said voltage biases said tube to cut-off.

4. An interference reducing unit for use with any of a plurality of receivers respectively having tuned carrier frequency channels operating over different frequency ranges; a signal translating means excited by the output of each channel, and a normally conducting electron tube interposed between said channel and said translating means; said unit comprising a frequency responsive circuit tuned to a fixed frequency which is below the frequency range of any of said channels for generating a unidirectional voltage only in response to signals of a frequency which is displaced in excess of a predetermined amount on either side of said fixed frequency, a frequency converter coupled to said frequency responsive circuit, said converter being tunable to convert the signal frequency output of any of said channels to said fixed frequency, and means to so couple the output of said frequency responsive circuit to said electron tube that said voltage reduces the output of said tube.

5. An interference reducing unit for use with any of a plurality of receivers respectively having carrier channels operating over different frequency ranges and signal translating means excited by the output of each channel; said unit comprising a tuned circuit having a passband which is outside the frequency range of any of said channels, a tunable frequency converter coupled to said tuned circuit for converting the signal frequency output of any of said channels to a frequency within said passband, means in said circuit to generate a voltage which is minimum in response to signals of a predetermined frequency within said passband and which increases in response to signals displaced from said predetermined frequency, and means to so couple said circuit to the translating means of any of said receivers that said voltage reduces the response of said translating means to signals.

OTTO F. A. ARNOLD.
DAVID A. BREISTER.

REFERENCES CITED

The following references are of record in the file of this patent:

UNITED STATES PATENTS

| Number | Name | Date |
| --- | --- | --- |
| 1,711,636 | Eaves | May 7, 1929 |
| 2,023,458 | Yolles | Dec. 10, 1935 |
| 2,024,816 | Carlson et al. | Dec. 17, 1935 |
| 2,096,874 | Beers | Oct. 26, 1937 |
| 2,115,813 | Jarvis | May 3, 1938 |
| 2,152,515 | Wheeler | Mar. 28, 1939 |
| 2,153,052 | Rodwin | Apr. 4, 1939 |
| 2,227,598 | Lyman et al. | Jan. 7, 1941 |
| 2,237,457 | Tellegen | Apr. 8, 1941 |
| 2,371,397 | Koch | Mar. 13, 1945 |

FOREIGN PATENTS

| Number | Country | Date |
| --- | --- | --- |
| 410,549 | Great Britain | May 24, 1934 |

Certificate of Correction

Patent No. 2,489,254                        November 29, 1949

OTTO F. A. ARNOLD ET AL.

It is hereby certified that error appears in the printed specification of the above numbered patent requiring correction as follows:

Column 6, line 30, for the word "fixer" read *fixed*;

and that the said Letters Patent should be read with this correction therein that the same may conform to the record of the case in the Patent Office.

Signed and sealed this 28th day of March, A. D. 1950.

[SEAL]

THOMAS F. MURPHY,
*Assistant Commissioner of Patents.*